United States Patent [19]
Kim

[11] Patent Number: 6,009,235
[45] Date of Patent: Dec. 28, 1999

[54] DIGITAL SIGNAL RECORDING/ REPRODUCING APPARATUS

[75] Inventor: Yong-je Kim, Suwon, Rep. of Korea

[73] Assignee: Samsung Electronics Co., Ltd., Kyungki-do, Rep. of Korea

[21] Appl. No.: 08/934,199

[22] Filed: Sep. 19, 1997

[30] Foreign Application Priority Data

Sep. 20, 1996 [KR] Rep. of Korea ............ 96-41366

[51] Int. Cl.⁶ ................................................ H04N 5/91
[52] U.S. Cl. ........................ 386/98; 386/112; 386/124
[58] Field of Search ............................. 386/1, 33, 39, 386/40, 95–96, 98, 108, 101, 111, 112, 124; H04N 5/91

[56] References Cited

U.S. PATENT DOCUMENTS

| | | | |
|---|---|---|---|
| 4,811,123 | 3/1989 | Yoshinaka ...................... | 360/26 |
| 5,371,551 | 12/1994 | Login et al. ................... | 386/112 |
| 5,371,602 | 12/1994 | Tsuboi et al. .................. | 386/95 |
| 5,394,275 | 2/1995 | Iketani et al. .................. | 386/35 |
| 5,398,138 | 3/1995 | Tomita ........................... | 386/96 |
| 5,414,567 | 5/1995 | Amada et al. ................. | 386/39 |
| 5,463,425 | 10/1995 | Tachi .............................. | 386/96 |
| 5,621,840 | 4/1997 | Kawamura et al. ........... | 386/68 |
| 5,764,847 | 6/1998 | Tanaka ........................... | 386/96 |
| 5,892,884 | 4/1999 | Sugiyama et al. ............. | 386/96 |

*Primary Examiner*—Wendy Garber
*Assistant Examiner*—Vincent F. Boccio
*Attorney, Agent, or Firm*—Sughrue, Mion, Zinn, Macpeak & Seas, PLLC

[57] ABSTRACT

An apparatus is disclosed for simultaneously recording and reproducing plurality of audio/video signals in a digital video cassette recorder and a digital video camera. One set of audio and video signals is designated as being the "main signals" and are recorded to and reproduced from a main data area according to a data recording format. Another set of audio and video signals is designated as being the "sub-signals" and are recorded to and reproduced from an auxiliary data area of the standard data recording format. Accordingly, a plurality of channels can be recorded or reproduced simultaneously. This also enables the simultaneous recording and reproduction of audio in two or more languages.

4 Claims, 5 Drawing Sheets

DIGITAL SIGNAL RECORDING/REPRODUCING APPARATUS

BACKGROUND OF THE INVENTION

1. Field of the Invention

The present invention relates to a digital signal recording/reproducing apparatus. More particularly, it relates to an apparatus for recording and reproducing a plurality of digital signals in a digital video cassette recorder or a digital video camera. This application for a digital signal recording/reproducing apparatus is based on Korean Patent Application No. 96-41366, which is incorporated herein by reference for all purposes.

2. Description of the Related Arts

In general, when plural video/audio signals are desired to be output or recorded simultaneously, picture-in-picture (PIP) or double screen is used. However, using the PIP or double screen has drawbacks in that extra hardware for preprocessing of video signal is required in order to compose a screen and it is difficult to satisfy the data recording/reproducing formats according to international standard.

SUMMARY OF THE INVENTION

It is an object of the present invention to provide an apparatus for recording a plurality of received digital audio/video signals simultaneously by adding video and audio signals to auxiliary data and sub-code data areas of a digital video signal standard format.

It is another object of the present invention to provide an apparatus for simultaneously reproducing main video and audio signals, as well as a video sub-signal and an audio sub-signal.

To accomplish the above object of the present invention, there is provided a digital signal recording apparatus, having a recording format having a data region for recording main video and audio signals and an auxiliary data region for recording video and audio sub-signals. The apparatus comprises main pre-processor and sub-signal pre-processor, for pre-processing the main video and audio signal and the video and audio sub-signal, respectively, according to a predetermined signal standard. A main signal processor compresses and processes the main video and audio signal of the main signal pre-processor. A synchronizer synchronizes the video and audio sub-signal of the sub-signal pre-processor according to a synchronizing signal and a phase generated by the main signal pre-processor. A data amount controller controls the amount of data of the video and audio sub-signal output from the synchronizer, according to the size of the sub-data region. A data packer packs the video and audio sub-signal, output from the data amount controller, into units in data of a predetermined size. A data processor sequentially arranges the main and sub-video and audio signals output from the main signal processor and the data packer. A modulator adds an error-correction parity and modulates the video and audio data output from the data processor.

To accomplish another object of the present invention, a digital signal reproducing apparatus is provided for reproducing a digital signal recorded on a data region for main video and audio signals and an auxiliary data region for video and audio sub-signals. This apparatus includes a demodulator for demodulating and error-correcting the reproduced modulated video and audio signals. A data separator separates the video and audio signals output from the demodulator into compressed main video and audio signals, and video and audio sub-signals packed into units of a predetermined size. A signal processor recovers the compressed main video and audio signals from the data separator. A data unpacker unpacks the packed video and audio sub-signals from the data separator. A data combiner combines the main video and audio signals from the signal processor with the video and audio sub-signals from the data unpacker, and outputs the combination.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
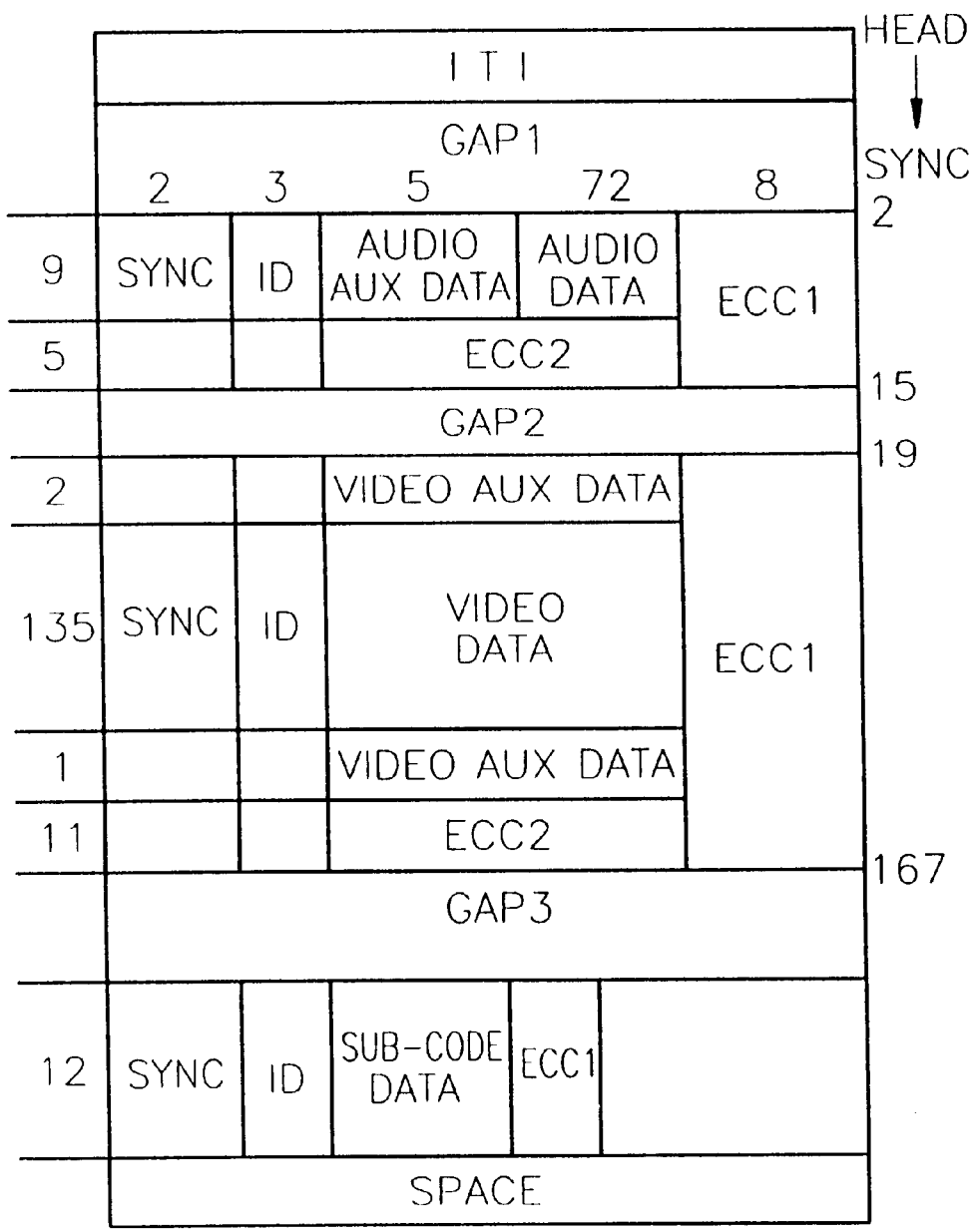
FIG. 1 shows a data format of one track in a typical digital video cassette recorder.

Referring to FIG. 1, insert and track information (ITI), audio data, video data and sub-code data are sequentially recorded in each region according to the processing sequence of a magnetic head. In an ITI region where the ITI is recorded, a reference signal is obtained when inserting edit data or recognizing a track structure. Audio and video regions, where audio and video data are recorded, have an audio auxiliary data region and a video auxiliary data region, respectively, for auxiliary information of each type of data. Empty spaces 'gap1,' 'gap2,' and 'gap3' are disposed between the four data recording regions, during recording to separate data regions. Also, an error correction character, i.e., a parity character, is added to each of the audio data regions, the video data region and the sub-code data region. That is, a first error correction code ECC1 is an internal character, and a second error correction code ECC2 is an external character. The ITI signal provides track information and position information of editing data. The audio and video auxiliary data regions and the sub-code data region include data regions (not shown) for recording date, time and hour, and a user region (not shown) on which additional audio or video data is recorded by a user. Each of the user regions in the audio and video auxiliary data regions is composed of 5-byte units.

Figure 2:
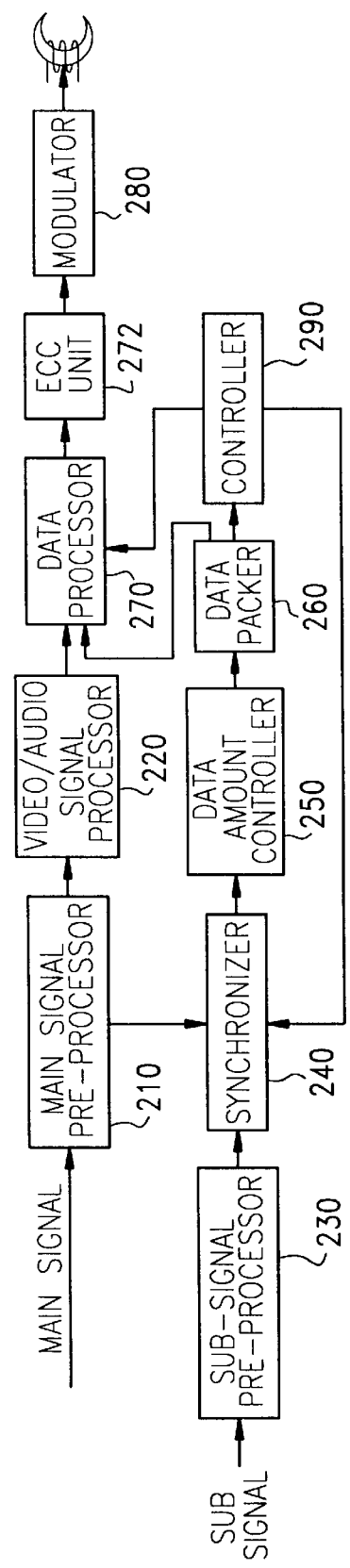
FIG. 2 is a block diagram of a digital signal recording apparatus according to the present invention.

Referring to FIG. 2, a digital signal recording apparatus includes a main signal pre-processor 210 for processing a main digital signal, a video and audio signal processor 220 for compressing and signal-processing the video and audio data processed by the main signal pre-processor 210, a sub-signal pre-processor 230 for signal-processing a digital sub-signal, a synchronizer 240 for synchronizing the sub-signal output from the sub-signal pre-processor 230 according to a synchronizing signal generated by the main signal processor 210, a data amount controller 250 for controlling the amount of the sub-signal data generated by the synchronizer 240, a data packer 260 for packing data generated by the data amount controller 250, a data processor 270 for receiving data from the data packer 260 and the video and audio signal processor 220 to arrange it corresponding to a standard, an error correction code (ECC) unit 272 for adding a parity to the data generated by the data processor 270, a modulator 280 for modulating data output from the ECC unit 272, and a controller 290 for applying control signals to the data amount controller 250 and the data processor 270.

As shown in FIG. 2, the main signal pre-processor 210 converts video and audio data which comprise a main digital signal, and generates synchronizing signals from the video data signal. The main digital signal corresponds to CCIR 601 standard or digital video cassette (DVC) standard, which are international standard signal formats of a digital video cassette recorder. In the video and audio signal processor 220, the video data output from the main signal pre-processor 210 is compressed by a predetermined degree through processes of discrete cosine transform (DCT), quantization and variable length coding. The video and audio signal processor 220 modulates a pulse-code of audio data. In the sub-signal pre-processor 230, a digital sub-signal comprising additional video and audio data is either subsampled or only data of an effective data interval is extracted. In the synchronizer 240, the horizontal 'H' and vertical 'V' synchronizing signals of the video data generated by the main signal pre-processor 210, and video and audio sub-signals output from the sub-signal pre-processor 230 by a phase of audio data, are synchronized with the main digital signal. In the data amount controller 250, the amount of the sub-signal data output from the synchronizer 240 is controlled in response to data of the controller 290 or is reduced by sub-sampling. For example, when the data size of a frame is 1000 bytes and data to be recorded on the video and audio auxiliary data regions of FIG. 1 is 500 bytes, then the controller 290 causes 500 bytes of data to be used for a recording region of a subsequent frame. On the other hand, the data amount can be reduced by sub-sampling. In the data packer 260, the additional video and audio data received from the data amount controller 250 is packed into 5-byte units to be recorded on the user regions of the video and audio auxiliary data regions. In the data processor 270, the sub-signal, received from the data packer 260 according to the control signal of the controller 290, is recorded on the user regions of the video and audio data auxiliary data regions and the sub-code data region. Data is arranged such that the main signal, output from the video and audio signal processor 220, is recorded on the video and audio data regions, and information of recording the sub-signal is added. The ECC unit 272 adds the parity for correcting errors to the video and audio data output from the data processor 270. The modulator 280 24–25 bit modulates the output of the ECC unit 272, so the data can be recorded on a recording medium such as a tape.

Figure 3:
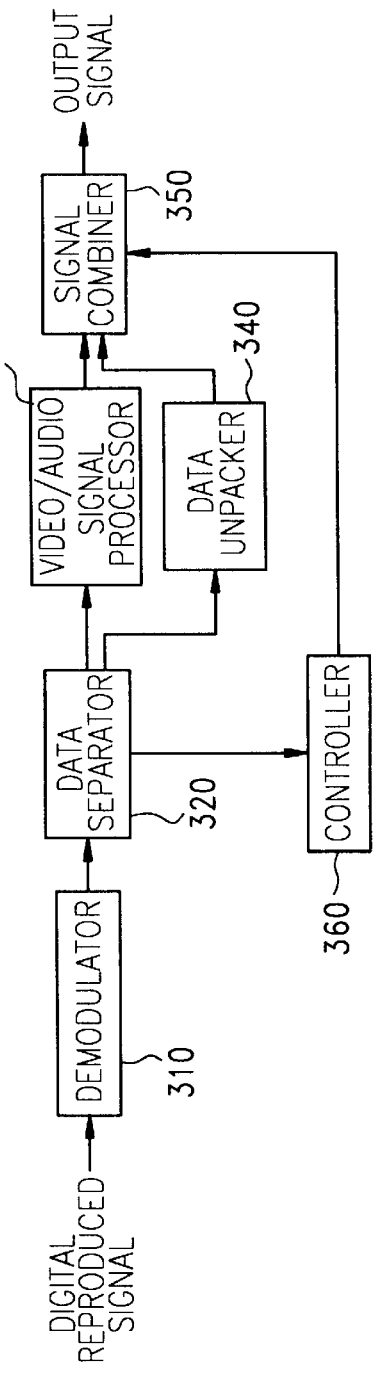
FIG. 3 is a block diagram of a digital signal reproducing apparatus according to the present invention.

Referring to FIG. 3, a digital signal reproducing apparatus includes a demodulator 310 for demodulating a reproduced modulated digital signal, a data separator 320 for separating data output from the demodulator 310 into a main signal and a sub-signal, a video and audio signal processor 330 for recovering the main signals separated by the data separator 320, a data unpacker 340 for unpacking the sub-signal from the data separator 320, a signal combiner 350 for combining the main signal from the video and audio signal processor 330 with the sub-signal from the data unpacking unit 340, and a controller 360 for extracting the sub-signal from the data separator 320 and applying a control signal to the signal combiner 350.

As shown in FIG. 3, in the demodulator 310, the reproduced digital signal is 25–24 bit converted, to be demodulated to the initial signal, and the demodulated data is error-corrected using an additional parity check. In the data separator 320, the error-corrected digital signal from the demodulator 310 is separated into the audio and video data of the audio and video data regions of FIG. 1. Here, also, data in which sub-signals, recorded on the user region in the audio and video auxiliary data regions and the sub-code data region, which are packed into 5-byte units are extracted and supplied to the data unpacker 340, and information of recording the sub-signals on the auxiliary data regions, are extracted and supplied to the controller 360. In the video and audio signal processor 330, the main signal, i.e., compressed audio and video data separated by the data separator 320, is restored to initial video and audio signals. In the data unpacker 340, the sub-signal from the data separator 320 is unpacked to be restored to an initial sub-signal. In the signal combiner 350, the main signal output from the video and audio signal processor 330 is combined with the sub-signal unpacked by the data unpacker 340, according to a control signal from the controller 360, to be simultaneously displayed as a main image and a sub-image.

Figure 4:
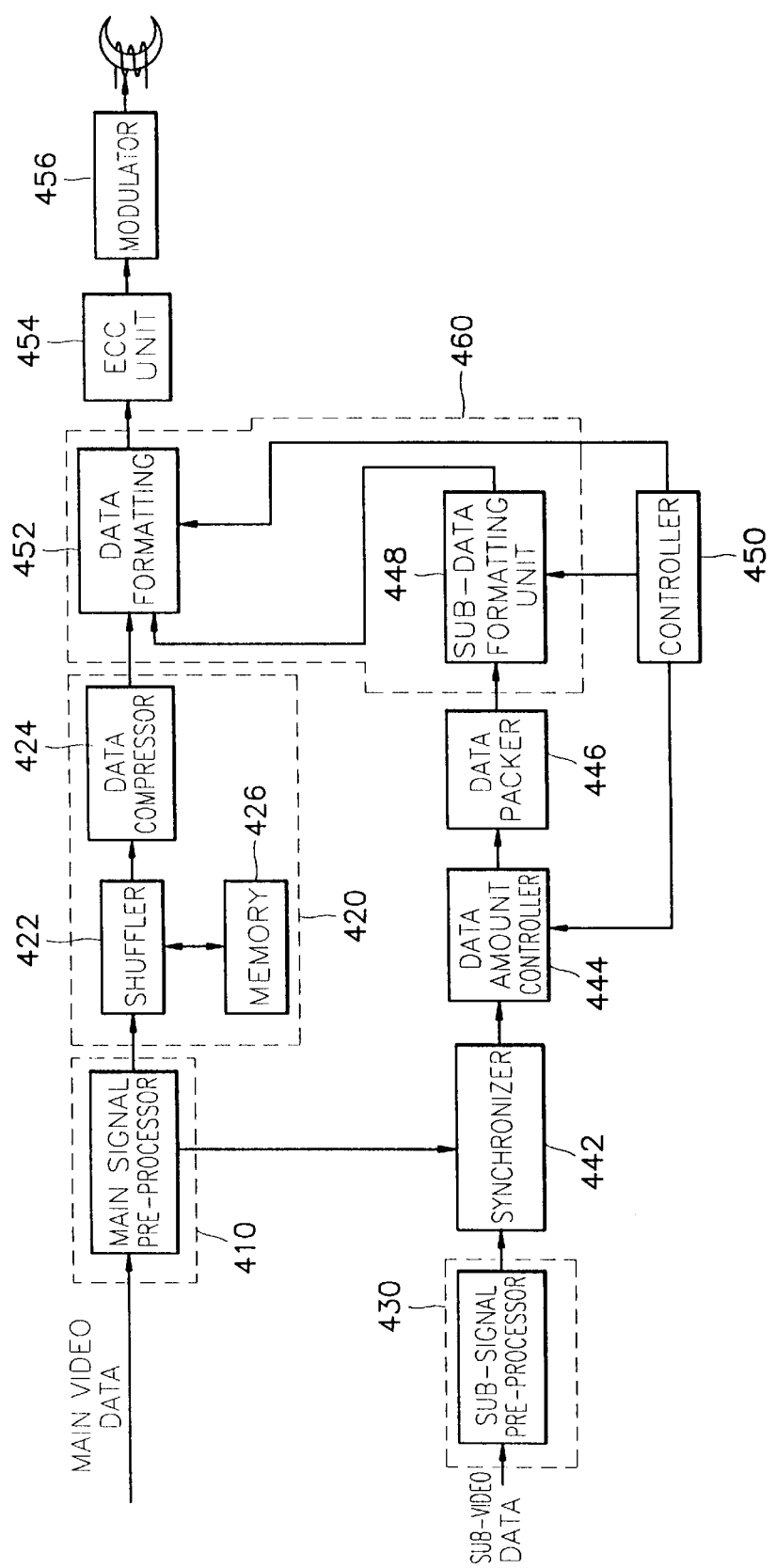
FIG. 4 is a detailed block diagram of the digital video signal recording apparatus of FIG. 2.

Referring to FIG. 4, a digital video signal recording apparatus includes a main signal pre-processor 410, a video signal processor 420 having a shuffler 422, a memory 426 and a data compressor 424, a sub-signal pre-processor 430, a synchronizer 442, a data amount controller 444, a data packer 446, a data processor 460 having a sub-data formatting unit 448 and a data formatting unit 452, an error correction code (ECC) unit 454, a modulator 456, and a controller 450. The controller 450 is for applying a control signal to the data amount controller 444, the sub-data formatting unit 448 and the data formatting unit 452. The ECC unit 454 is for adding a parity to video data for correcting an error.

As shown in FIG. 4, a signal separator and synchronization detector is installed in the main signal pre-processor 410. In the main signal pre-processor 410, main video data is separated into luminance 'Y' and base band chrominance 'Cr, Cb', corresponding to the CCIR 601 standard, and when no external synchronizing signal is input, synchronization separation is performed. When the external synchronizing signal is input, the synchronizing signal is used. Here, the received main video data may be composite video data, luminance 'Y' and chrominance 'C' data, or luminance and chrominance 'Cb, Cr' data. The operation state of the signal separator and synchronization detector is changed according to the received data type. In the shuffler 422, video data output from the main signal pre-processor 410 is shuffled. At this time, the shuffling process is for shuffling sequences of video data, of a predetermined unit size, to enhance compression efficiency. The video data is temporarily stored in the memory 426, to perform the shuffling in the shuffler 422. In the data compressor 424, the video data output from the shuffler 422 is compressed through DCT and quantization. The sub-signal pre-processor 430 also includes a signal separator and synchronization detector, or when the synchronizing signal is input from the outside, the a signal separator and synchronization detector is not included. In the signal separator and synchronization detector, the video sub-data is separated to luminance 'Y' and chrominance 'C' and when no external synchronizing signal is applied, the external horizontal 'H' and vertical 'V' synchronizing signal is detected from the video sub-data. In the synchronizer 442, the horizontal 'H' and vertical 'V' synchronizing signals, generated by the signal separator and synchronization detector of the sub-signal pre-processor 430, are synchronized with the horizontal and vertical synchronizing signals detected by the signal separator and synchronization detector of the main signal pre-processor 410.

In the data amount controller 444, the amount of video sub-data output from the synchronizer 442 is controlled, according to a control signal from the controller 450, to be recorded on the user region of the video auxiliary data region and the sub-code data region. In the data packer 446, the video data output from the data amount controller 444 is packed into units corresponding to the size of the user region. In the sub-data formatting unit 448, the video sub-data output from the data packer 446 is arranged, according to the control of the controller 450, to correspond to formats of the video auxiliary data region and the sub-code data region. In the data formatting unit 452, the data output from the data sub-data formatting unit 448 and the video signal processor 420 is sequentially arranged according to the control of the controller 450. In the ECC unit 454, a parity code added for error-correcting data from the data formatting unit 452. In the modulator 456, data from the ECC unit 454 is 24–25 bit modulated.

Figure 5:
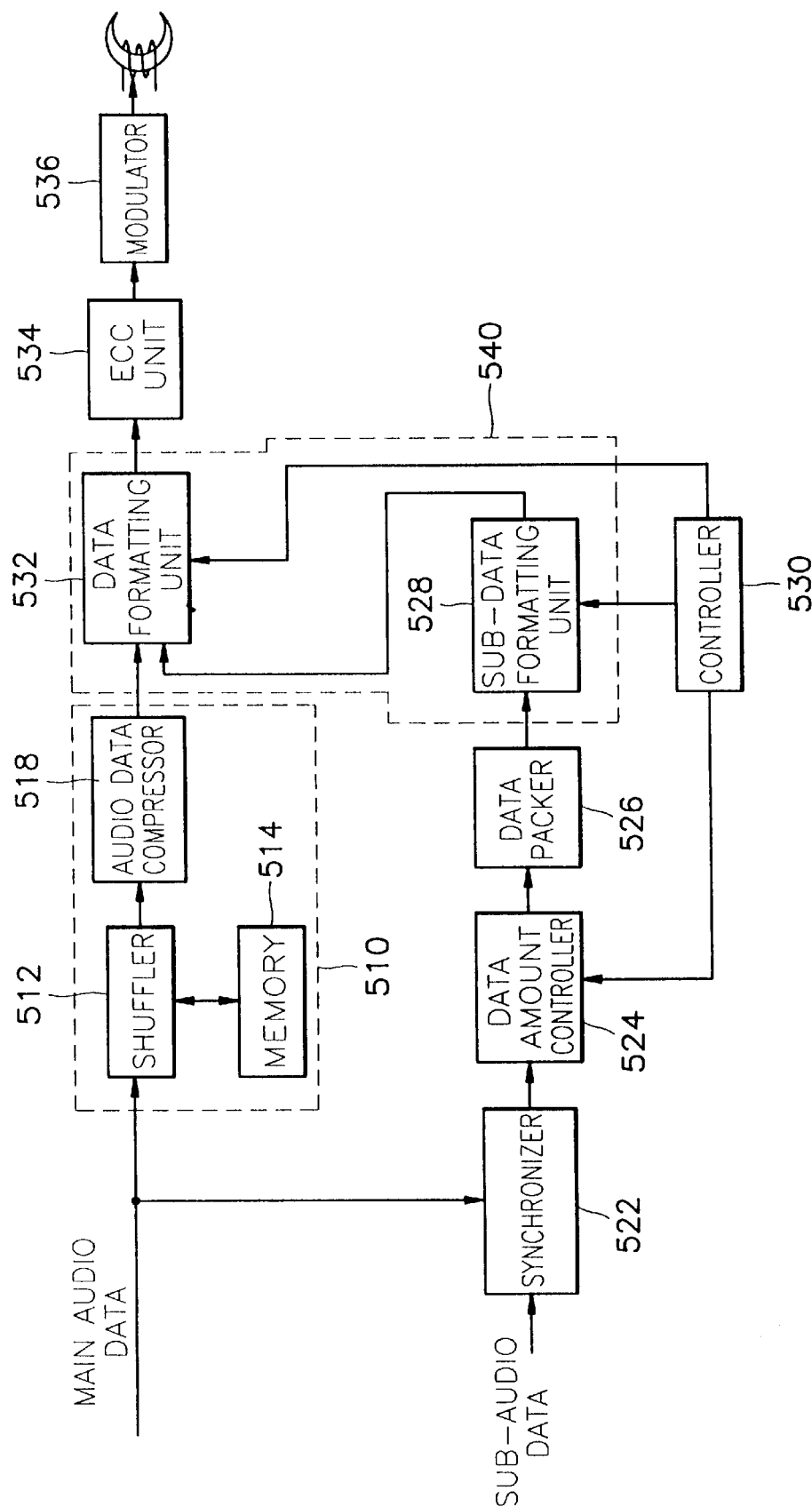
FIG. 5 is a detailed block diagram of the digital audio signal recording apparatus of FIG. 2.

Referring to FIG. 5, the digital audio signal recording apparatus includes a main audio signal processor 510 having a shuffler 512, an audio data processor 518 and a memory 514, a synchronizer 522 for synchronizing a synchronizing signal of main audio data, a data amount controller 524, a data packer 526, a data processor 532 consisting of a sub-data formatting unit 528 and a data formatting unit 532, an ECC unit 534, a modulator 536, and a controller 530. The controller 530 is for applying control signals to the data amount controller 524, the sub-data formatting unit 528 and the data formatting unit 532.

As shown in FIG. 5, in the shuffler 512, sequences of the received main audio data, of a predetermined unit size, are shuffled using the memory 514, to thereby prevent errors generated in the recording medium. In the audio data processor 518, the audio signals output from the shuffler 512 are arranged. In the synchronizer 522, audio sub-data is synchronized by a phase of the main audio data, such that the phase of the main audio data corresponds to that of the audio sub-data. In the data amount controller 524, the amount of audio sub-data output from the synchronizer 522 is controlled, according to a control signal of the controller 530, to be recorded on the audio auxiliary data and sub-code regions of a frame of FIG. 1 in data units of a predetermined size. That is, when too much audio sub-data exists, the excess audio sub-data is recorded on the same region of a subsequent frame, or the data size is controlled through a process of sub-sampling or quantization. In the data packer 526, the audio sub-data output from the data amount controller 524 is packed into 1 byte×5 byte units corresponding to the user region. In the sub-data formatting unit 528, the audio sub-data output from the data packer 526 is arranged, according to the control of the controller 530, to correspond to the formats of the audio auxiliary data region and the sub-code data region. In the data formatting unit 532, the audio data output from the sub-data formatting unit 528 and the audio signal processor 510 is arranged, according to the control of the controller 530, to be sequentially recorded on the track of FIG. 1. In the ECC unit 534, a parity code is added to provide for error-correcting of the data from the data formatting unit 532. In the modulator 536, the audio data output from the ECC unit 534 is modulated and output.

Figure 6:
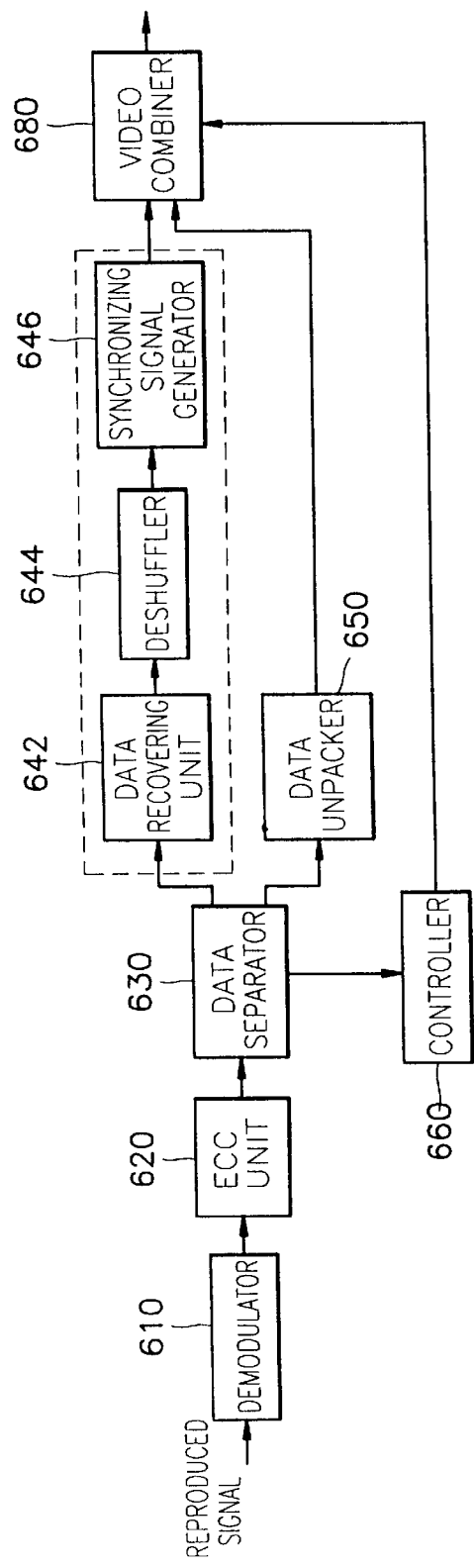
FIG. 6 is a detailed block diagram of the digital video signal reproducing apparatus of FIG. 3.

Referring to FIG. 6, the digital video signal reproducing apparatus includes a demodulator 610, an ECC unit 620, a data separator 630, a video signal processor 640 having a data recovering unit 642, a deshuffler 644 and a synchronizing signal generator 646, a data unpacker 650, a video compounder 680 and a controller 660.

As shown in FIG. 6, in the demodulator 610, the modulated 25-bit video data from the recording medium is demodulated to 24-bit video data. In the ECC unit 620, the video data demodulated in the demodulator 610 is error-corrected using an added parity. In the data separator 630, the video data, error-corrected in the ECC unit 620, is separated into main video data and packed video sub-data, and recording information of the video sub-data of the auxiliary data region is output to the controller 660. In the data recovering unit 642, compressed video data received from the data separator 630 is restored to initial video data. In the deshuffler 644, the shuffled main video data output from the data recovering unit 642 is deshuffled. In the synchronizing signal generator 646, a synchronizing signal of the main video signal is generated. Also, in the data unpacker 650, the video sub-data which is output from the data separator 630, packed into predetermined units, is unpacked. In the video combiner 680, main video data output from the video signal processor 640 is combined with video sub-data output from the unpacker 650, according to a control signal from the controller 660, to simultaneously display a main image and a sub-image.

Figure 7:
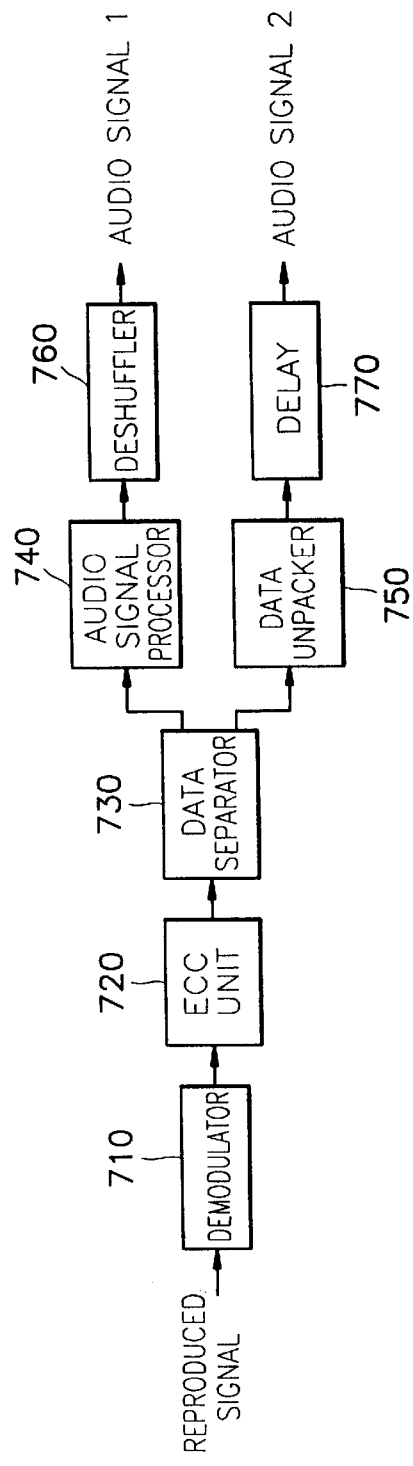
FIG. 7 is a detailed block diagram of the digital audio signal reproducing apparatus of FIG. 3.

Referring to FIG. 7, the digital audio signal reproducing apparatus includes a demodulator 710, an ECC unit 720, a data separator 730, an audio signal processor 740, a data unpacker 750, a deshuffler 760 and a delay 770. The deshuffler 760 is for deshuffling shuffled main audio data and outputting a first audio signal. The delay 770 is for delaying audio sub-data and outputting a second audio signal.

As shown in FIG. 7, in the demodulator 710, a modulated audio signal reproduced from a recording medium is demodulated. In the ECC unit 720, the audio data demodulated by the demodulator 710 is error-corrected using an added parity. In the data separator 730, the error-corrected data from the ECC unit 720 is separated into audio data from the audio and video data region of FIG. 1 and audio sub-data which is from a user region of the audio auxiliary data region and is packed into predetermined units. In the audio signal processor 740, main audio data is separated into right and left channels and formatted to correspond to an output type. In the deshuffler 760, the shuffled main audio data is deshuffled to be output as a first audio signal. Here, the main audio data having the modulated pulse code may be output without data processing. In the data unpacker 750, audio sub-data packed into predetermined units, is unpacked. In the delay 770, the audio sub-data is delayed, to be synchronized with the main audio, and then is output as a second audio signal.

According to the present invention, in a standard video cassette recorder or video camera, a plurality of channels can be recorded simultaneously or reproduced simultaneously, and audio recordings in two or more languages can be recorded and reproduced.

Although the present invention has been described with reference to preferred embodiments, it will be appreciated that various modifications may be made to the described embodiments without departing from the spirit and scope of the invention.

What is claimed is:

1. A digital signal recording apparatus, having a recording format having a data region for recording main video and audio signals and an auxiliary data region for recording video and audio sub-signals, the recording apparatus comprising:

main signal pre-processor, for pre-processing said main video and audio signals according to a predetermined signal standard;

sub-signal pre-processors, for pre-processing said video and audio sub-signals according to said predetermined signal standard;

a main signal processor for compressing and processing the main video and audio signal pre-processed by said main signal pre-processor;

a synchronizer for synchronizing the video and audio sub-signals pre-processed by said sub-signal pre-processor according to a synchronizing signal and a phase generated by said main signal pre-processor, to output synchronized video and audio sub-signals;

a data amount controller, for controlling the amount of data of the synchronized video and audio sub-signals, according to the size of said auxiliary data region, to output amount controlled video and audio sub-signals;

a data packer for packing the amount controlled video and audio sub-signal, output from said data amount controller, into data units of a predetermined size;

a data processor for sequentially arranging main video and audio signals output from said main signal processor with packed video and audio sub-signals output from said data packer, to produce combined video and audio data; and a modulator, for adding an error-correction parity code to said combined video and audio data, and for modulating said video and audio data.

2. The digital signal recording apparatus according to claim 1, wherein said auxiliary data region is a user region added to said data region.

3. The digital signal recording apparatus according to claim 1, wherein said auxiliary data region is a region where video and audio data of one or more channels is recorded.

4. A digital signal reproducing apparatus for reproducing a digital signal containing compressed main video and audio signals and video and audio sub-signals, the compressed main video and audio signals being recorded on a data region, and the video and audio sub-signals being recorded on an auxiliary data region, the reproducing apparatus comprising:

a demodulator for demodulating and error-correcting the digital signal upon being reproduced, to produce a demodulated/corrected digital signal;

a data separator for separating the demodulated/corrected digital signal into compressed main video and audio signals and video and audio sub-signals, the video and audio sub-signals being packed into units of a predetermined size;

a signal processor for recovering the compressed main video and audio signals from said data separator, and outputting main video and audio signals;

a data unpacker for unpacking the packed video and audio sub-signals from said data separator, and outputting video and audio sub-signals; and a data combiner for combining the main video and audio signals output by said signal processor with the video and audio sub-signals output by said data unpacker, and outputting the combination.

* * * * *